United States Patent
Yessayan

(10) Patent No.: US 7,583,201 B1
(45) Date of Patent: Sep. 1, 2009

(54) EXTERNAL COMPUTER HARD-DRIVE ENCLOSURE

(76) Inventor: Raffy Yessayan, 647 N. Glendora Ave., Glendora, CA (US) 91741

( * ) Notice: Subject to any disclaimer, the term of this patent is extended or adjusted under 35 U.S.C. 154(b) by 104 days.

(21) Appl. No.: 11/998,190

(22) Filed: Nov. 30, 2007

(51) Int. Cl.
G08B 5/00 (2006.01)

(52) U.S. Cl. ............ 340/815.4; 340/384.1; 340/426.15; 340/458; 340/435; 340/464; 340/815.45; 361/685; 361/687; 361/695

(58) Field of Classification Search .............. 340/384.1, 340/426.15, 458, 435, 464, 815.45; 361/685, 361/687, 695
See application file for complete search history.

(56) References Cited

U.S. PATENT DOCUMENTS

| | | | |
|---|---|---|---|
| 4,848,699 A | 7/1989 | Jing-Lin | |
| 4,919,357 A | 4/1990 | Jing-Lin | |
| D328,736 S | 8/1992 | Hodge | |
| D336,648 S | 6/1993 | Hsu | |
| D415,129 S | 10/1999 | Wu | |
| 6,876,547 B2 | 4/2005 | McAlister | |
| D526,638 S | 8/2006 | Farkas | |
| 7,139,166 B2 | 11/2006 | Marcade et al. | |
| 2006/0164753 A1* | 7/2006 | Huang | 360/97.02 |

* cited by examiner

Primary Examiner—Tai T Nguyen
(74) Attorney, Agent, or Firm—Albert O. Cota

(57) ABSTRACT

An external hard drive enclosure (EHDE 10) that is in the form of a decorative enclosure (20) for an external hard drive (86), and an electrical circuit (12) that interfaces with an external computer (84). The decorative enclosure can be configured as a vehicle, and includes a lower panel (22) having a cavity (32) that allows the hard drive (86) to be easily inserted into and removed from the vehicle. The EHDE (10) operates with the electrical circuit (12) that includes a pair of white LED head lights (DS1,DS2), at least one blue LED (DS3) that illuminates the interior of the vehicle, and a pair of red LED tail lights (DS4,DS5). The red tail lights (DS4,DS5) are synchronized to illuminate only when the computer (84) is accessing the external hard drive (86).

20 Claims, 4 Drawing Sheets

EXTERNAL COMPUTER HARD-DRIVE ENCLOSURE

TECHNICAL FIELD

The invention generally pertains to computer external hard-drives, and more particularly to a decorative enclosure that encloses a hard-drive and that includes a pair of LEDs that only illuminate when the computer is accessing the hard-drive.

BACKGROUND ART

In most developed countries, computers have become one of the most ubiquitous parts of everyday life. Either for business or personal use, computers have become an indispensable tool that people relay on to communicate, acquire information and store information.

During the last few years, computers have become useful for an even greater number of applications, such as audio and video production. The reason for this is because of increases in computer performance as a result of higher processor speeds and the greater amount of memory available, both of which can be manufactured and sold at much lower prices than before.

One of the most significant increases in computer performance is the size, and therefore storage capacity of hard drives. A hard drive is an information/data storage and retrieval device and is available as an internal version, which resides within a computer, or an external version. The external version is connected to the computer by means of a USB or IEEE 1394 (Firewire) cable and can be connected to a power source via an IEEE 1394 connector, a USB connector, or by a separate power cable.

External hard drives are especially popular due to the fact that they can be quickly and easily disconnected from the computer and transported. Unfortunately, computer hardware designers have long appeared to be more interested in the functionally and performance of an external hard drive, as opposed to the hard driver's physical appearance. Although some designers, such as Porsche, have began creating enclosures for external hard drives, the designs do not deviate too far from the standard square/rectangular shaped box.

What is needed is a new type of external hard drive enclosure that can function as required for the hard drive, but also has an appearance that will belie its purpose. By providing a hard drive enclosure with the appearance of an item, such as an automobile, a person will be able to effectively utilize an external hard drive while at the same time expressing some individuality.

A search of the prior art did not disclose any industry literature or patents that read on the claims of the instant application. However, the following patents are considered related:

| PATENT NO. | INVENTOR | ISSUED |
| --- | --- | --- |
| D526,638 | Farkas | 15 Aug. 2006 |
| D336,648 | Hsu | 22 Jun. 1993 |
| 4,919,357 | Jing-Lin | 24 Apr. 1990 |
| 4,848,699 | Jing-Lin | 18 Jul. 1989 |

The D526,638 and D336,648 design patents each disclose a structure, a vehicle and a piano respectively, that could be utilized to enclose and store an external passive hard drive. However, the utilization of the two patents to enclose an operable hard drive is not disclosed.

The U.S. Pat. No. 4,919,357 discloses a video-tape rewinding structure having an outward shape that resembles a steamer, a sailboat, or a ferry boat. The mechanical components for rewinding the video-tape are arranged on the floor-boards of the structure and a tape case is provided on the deck. The tape case is raised up or down for placing in or taking out a video tape by pressing a push button located on the front of the deck.

The U.S. Pat. No. 4,848,699 discloses a video tape rewinder having a shape of a model car on whose chassis a tape rewinding system is mounted. A case body is raised up or down at the front for receiving a video tape and for storing a cleaning tape. The rewinding system includes a motor and a set of gears for revolving a main winding head that is mounted on a movable base. The movable base is moved by the motor to open the case body and to cut-off the electric power when the rewinding has been completed.

For background purposes and as indicative of the art to which the invention is related reference may be made to the following remaining patents located in the search:

| PATENT NO. | INVENTOR | ISSUED |
| --- | --- | --- |
| 7,139,166 | Marcade et al | 21 Nov. 2006 |
| 6,876,547 | McAlister | 5 Apr. 2005 |
| D415,129 | Wu | 12 Oct. 1999 |
| D328,736 | Hodge | 18 Aug. 1992 |

DISCLOSURE OF THE INVENTION

The external hard drive enclosure (EHDE) is designed to provide a practical and aesthetic enclosure for operating and storing an external computer hard drive. In its basic design, the EHDE is comprised of two major inventive elements: an electrical circuit and a decorative enclosure. The inventive elements operate in combination with an a-c to d-c converter that is enabled by a utility power source which delivers a d-c voltage ranging from 5.0 to 6.5 volts d-c. The d-c voltage is utilized to power a computer and a computer/hard drive interface card that produces a first output and a second output that connect to the inventive electrical circuit.

The electrical circuit is comprised of a forward light circuit, a rearward light circuit and an optional interior light circuit. The forward light circuit, which is also referred to as a head light circuit in the preferred embodiment, utilizes two LEDs (DS1, DS2) that illuminate when power is applied to the computer. In one case, the output from the computer may be sufficient to operate the forward light circuit. If the computer does not have sufficient power, the forward light circuit can be directly connected to the output from the a-c to d-c converter via the computer/hard drive interface card. The optional interior light circuit utilizes at least one LED (DS3) that is connected in parallel across the forward light circuit. Therefore, when power is applied as described above, the interior light circuit will also illuminate.

The rearward light circuit, which is also referred to as a tail light circuit in the preferred embodiment, is connected to the second output from the computer/hard drive interface card. The second output is connected to two LEDs (DS4, DS5) that are activated when power is present at the second output, which occurs only when the computer is accessing the hard drive. Therefore, the two LEDs (DS4,DS5) illuminate in synchrony with the operation of the computer.

The decorative enclosure of the EHDE can be constructed of various materials such as plastic, wood or metal, and in various configurations such as a vehicle, a ship, an animal, a toy or in a variety of geometric shapes. For whatever configuration is selected, the decorative structure includes:

(1) a lower panel having means for receiving and attaching the hard drive and the computer/hard drive interface card. In one attachment means the lower panel can include a cavity into which is inserted and attached by complimentary hook and loop fasteners the hard drive and the computer/hard drive interface card, (2) a right side panel and a left side panel that extend upward from the lower panel, (3) a front panel and a rear panel that extend upward from the lower panel, wherein the front panel has a right and a left bore into which is inserted and attached the LEDS (DS1) and (DS2), and wherein the rear panel also has a right and a left bore into which is inserted and attached the LEDs (DS4) and (DS5), and (4) an upper panel that interfaces with the upper edge of the right and left side panels, and the front and rear panels.

In view of the above disclosure, the primary object of the invention is to provide a decorative structure that encloses an external computer hard-drive. The decorative structure incorporates a set of LEDs that illuminate when the hard drive is powered, and a set of LEDs that only illuminate when the computer is being accessed.

In addition to the primary object of the invention, it is also an object of the invention to produce an external computer hard drive enclosure that:

can be constructed of various materials, can be produced to resemble a variety of shapes, can be produced in a variety of colors, can be dimensioned to accept various sizes of hard drives, is designed to allow the electrical circuit to be maintained, and can be utilized by professional, hobbyists and others.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment for an external hard drive enclosure 10 (hereinafter EHDE 10). The EHDE 10 is primarily designed to enclose a computer hard drive. However, other electronic devices such as an ethernet modem, a router, a media card reader or a flash memory can also be enclosed and operated by the invention. Additionally, the enclosure can be designed to represent a variety of items such as, but not limited, to a vehicle, a ship, an animal, a toy, a plant, a musical instrument, a sport helmet or a geometric structure. For the sake of brevity, the EHDE 10 will be described in terms of the preferred embodiment, which includes an electrical circuit 12. The circuit 12 is used to control the operation of a hard drive that is enclosed within a decorative structure 20 which is configured as an automobile such as a two-door sedan.

Figure 1:
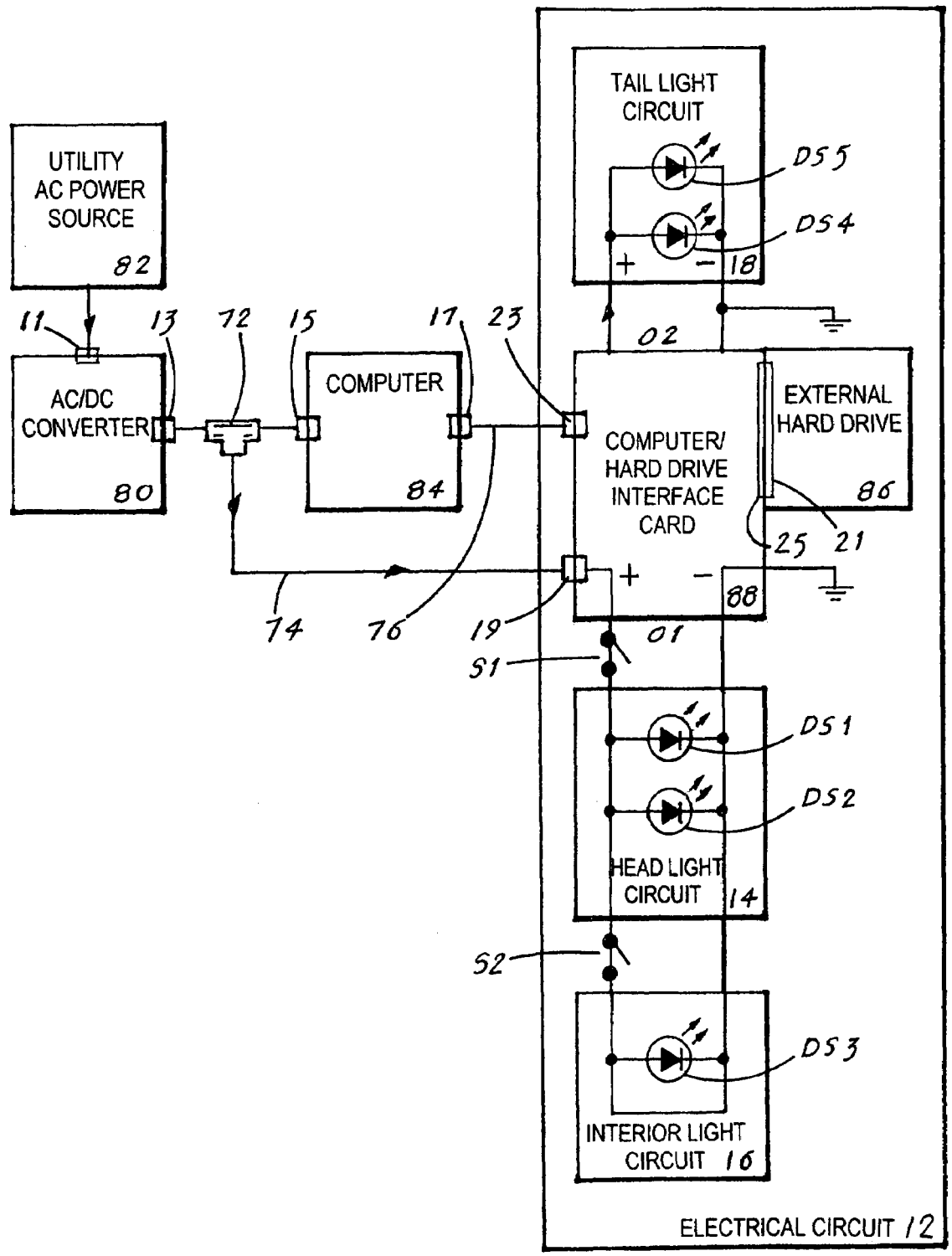
FIG. 1 is a combination schematic and block diagram of the electrical circuit that is utilized in the external hard drive enclosure.

The electrical circuit 12, as shown in FIG. 1, is comprised of a head light circuit 14, an interior light circuit 16 and a tail light circuit 18. The electrical circuit 12 operates in combination with the following prior art elements, as also shown in FIG. 1.

A. An a-c to d-c converter 80 having a power input 11 and a power output 13. The power input 11 is supplied from a utility a-c power source 82 that typically produces an output voltage consisting of 120 volts a-c. The output of the d-c to dc converter 80 ranges between 5.0 volts d-c to 12.0 volts d-c.

B. A computer 84 that can be comprised of a desk top computer or a laptop computer having a power input 15 and an ethernet, IEEE 1394 or USB output 17. The power input 15 is connected to the power output 13 on the a-c to d-c converter 80 via a T-connector 72.

C. An external hard drive 86 having a hard drive input/output 21, and

Figure 2:
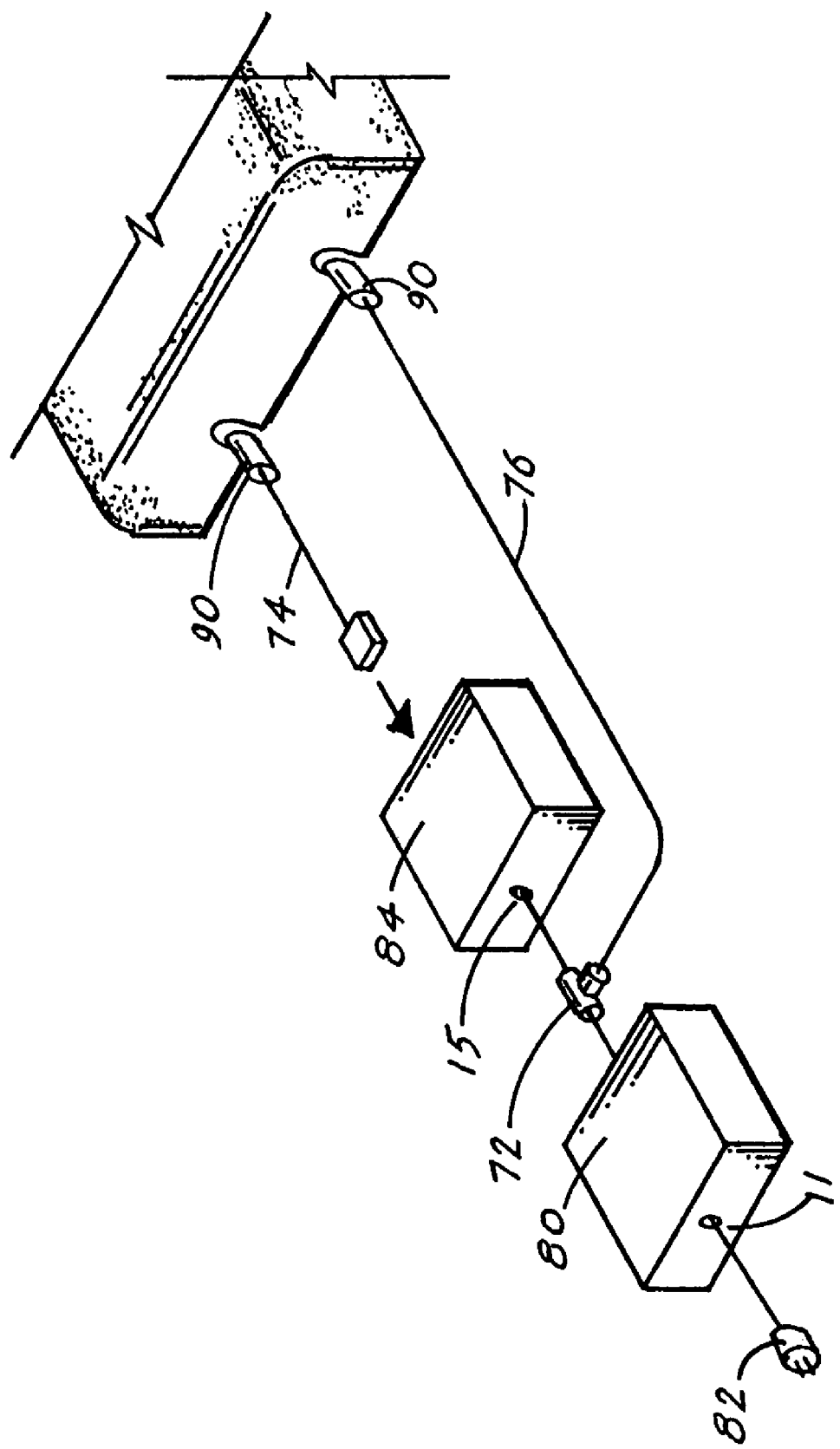
FIG. 2 is a perspective view showing the USB cable and the power cable extending from the exhaust tips of an automobile to the computer and the a-c to d-c converter.

D. A computer/hard drive interface card 88 having a USB input 23 that is connected to the USB output 17 on the computer 84 via a USB cable 74, a hard drive output 25 that is connected to the hard drive input/output 21 on the external bard drive 86, a first power output 01 connected to the power output 13 on the a-c to d-c converter 80 via a power cable 76 and the T-connector 72, and a second power output 02 that is controlled by the operation of the external hard drive 86. For aesthetic purposes, the USB cable 74 and the power cable 76 can extend from the vehicle exhaust tips 90, as shown in FIG. 2.

The head light circuit 14, as shown in FIG. 1, is comprised of a first LED DS1 and a second LED DS2. The first LED DS1 is connected in parallel across the output O1 on the computer/hard drive interface card 88. The second LED DS2 is connected in parallel across the first LED DS1, as also shown in FIG. 1. The first and second LEDs are comprised of white LEDs.

The interior light circuit 16, as shown in FIG. 1, is comprised of at least one LED DS3 that is connected in parallel across the first LED DS1 and the second LED DS2. The third LED DS3 is preferably comprised of a blue LED.

The tail light circuit 18, as also shown in FIG. 1, is comprised of a fourth LED DS4 and a fifth LED DS5. The fourth LED DS4 is connected in parallel across the output O2 on the computer/hard drive interface card 88. The fifth LED DS5 is connected in parallel across the fourth LED DS4. The fourth and fifth LEDs DS4, DS5 are comprised of red LEDs. Although the preferred colors of the LEDs are as listed above, other colors can also be utilized to suit the preference of the end user of the invention.

The electrical circuit 12, as shown in FIG. 1, can also be designed to include a first switch S1 and a second switch S2. The first switch S1 is connected in series between one of the leads from the output O1 of the computer/hard drive interface card 88 and the first LED DS1. The second switch S2, as also shown in FIG. 1, is connected in series between the second LED DS2 and the third LED DS3. When the first switch S1 and the second switch S2 are closed, both the head light circuit 14 and the interior light circuit 16 are on. When the switch S2 is closed or open and the switch S1 is open, both the head light circuit 14 and the interior light circuit 16 are off. When the switch S1 is closed and the switch S2 is open, the head light circuit 14 is on and the interior light circuit 16 is off.

Note, if a 12.0 volt d-c output is produced by the a-c to d-c converter 80, it will be necessary to add a voltage dropping resistor (not shown) at the input to the LED circuits.

Figure 3:
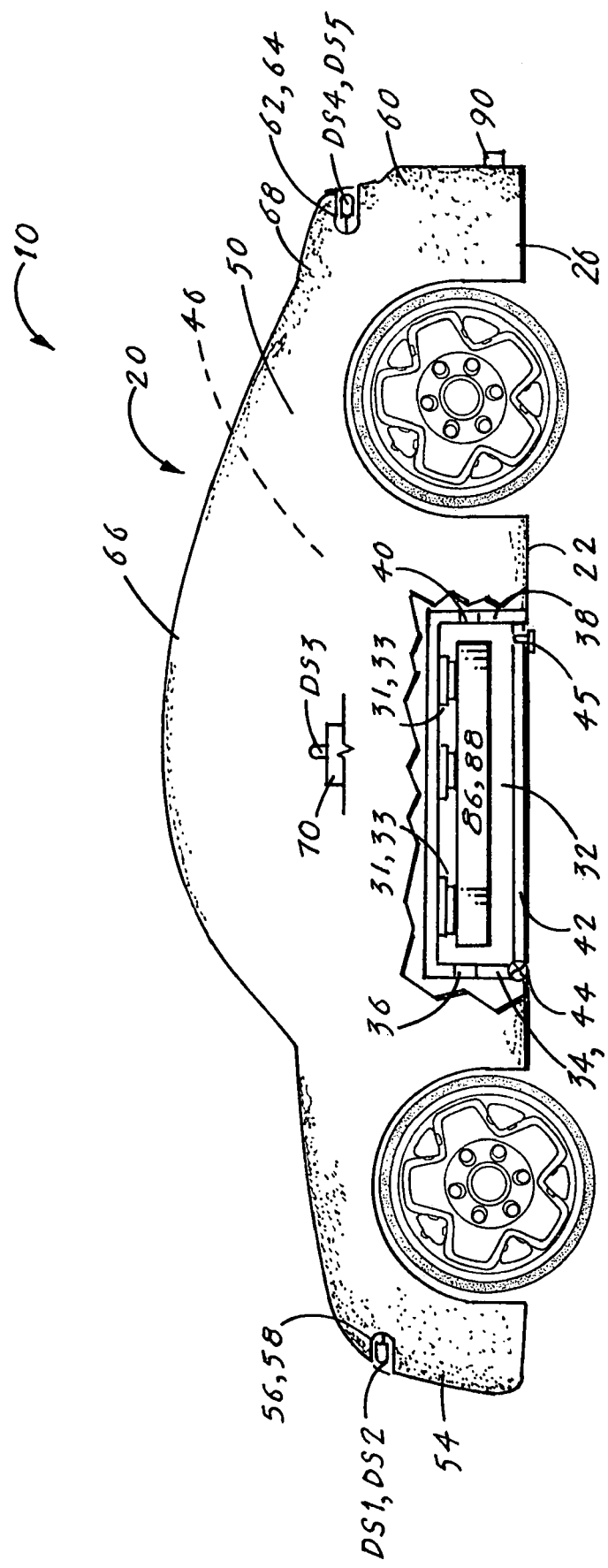
FIG. 3 is a side elevational view of the EHDE showing the location of the head lights, the tail lights, the interior lights, and the cavity into which is inserted and attached the hard drive and the computer/hard drive interface card
Figure 4:
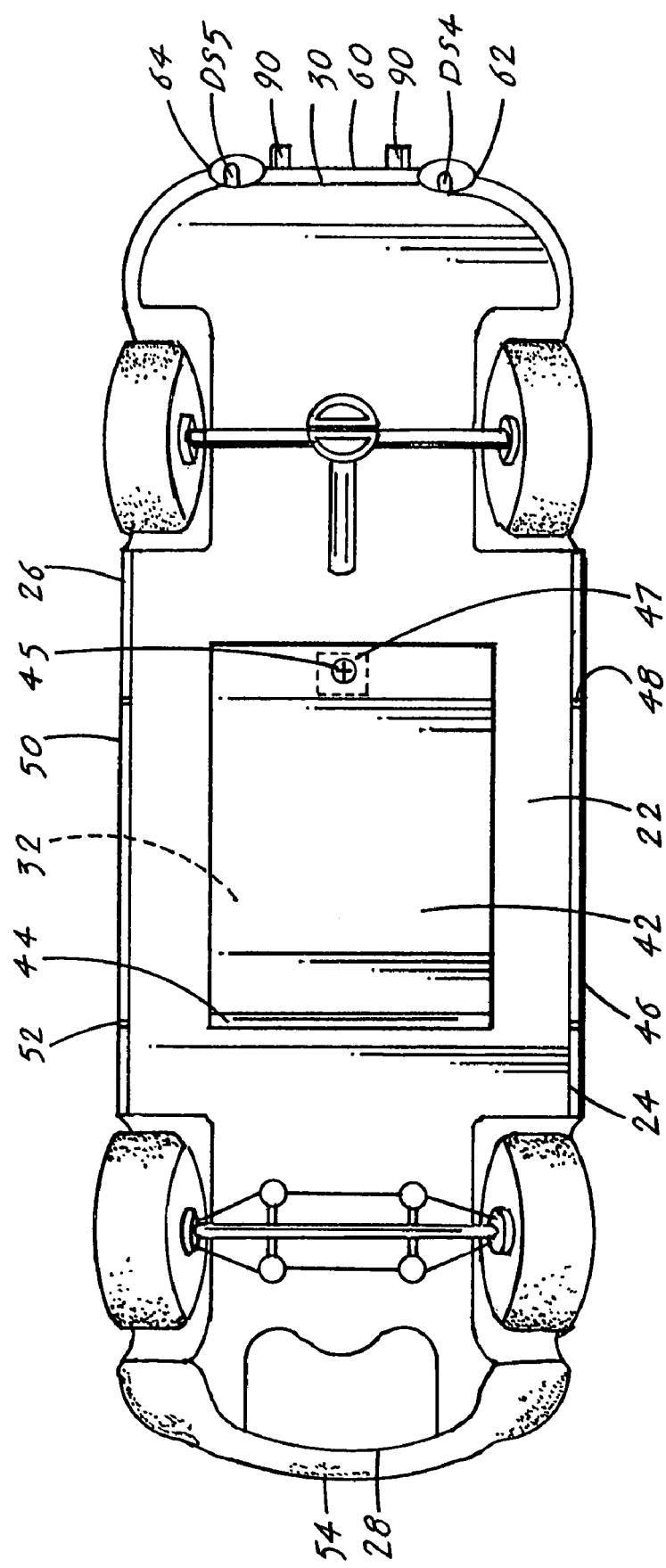
FIG. 4 is a bottom plan view of the EHDE showing the location of the cavity.

The decorative enclosure 20, as shown in FIGS. 3 and 4, is described in the preferred embodiment in terms of an automobile 20, which is comprised of a lower panel 22, an integral right side panel 46, an integral left side panel 50, an integral front panel 54, an integral rear panel 60 and an upper panel 66. All the panels, with the exception of the lower panel 22, are seamless.

The lower panel 22 has a right edge 24, a left edge 26, a front edge 28, a rear edge 30 and a cavity 32. The cavity 32, as shown in FIGS. 3 and 4, is dimensioned to receive and attach by an attachment means 31 the external hard drive 86 and the computer/hard drive interface card 88. The preferred attachment means is comprised of a set of hook and loop fasteners 33. However, a combination tab and slot arrangement (not shown) can also be utilized. The cavity 32 has a front section 34 having a front access bore 36 and a rear section 38 having a rear access bore 40. The two bores 36,40 are dimensioned and located to accommodate the cables 74,76 and wiring of the electrical circuit 12. The cavity 32 can also be designed to include a cavity cover 42, as shown in FIGS. 3 and 4, that is hinged preferably by a living hinge 44. The door is secured by means of a screw or a bolt 45 that interfaces with an interior vehicle structure.

The integral right side panel 46 extends upward from the right edge 24 of the lower panel 22, and the integral left side panel 50 extends upward from the left edge 26 of the lower panel 22. Likewise, the integral front panel 54 extends upward from the front edge 28 of the lower panel 22 and has a right bore 56 and a left bore 58. The two bores 56,58 are dimensioned to accept and retain by an adhesive or by a press-fit the LED DS1 and LED DS2 respectively. The two LEDs DS1, DS2 represent the front head lights of the automobile.

The integral rear panel 60 extends upward from the rear edge 30 of the lower panel 22. The rear panel 60 has a right bore 62 and a left bore 64, which are dimensioned to accept and retain by an adhesive or by a press-fit the LED DS4 and the LED DS5 respectively. The two LEDs DS4, DS5 represent the tail lights of the automobile 20.

The upper panel 66 has a perimeter edge 68 that integrally interfaces with the upper edges of the right side panel 46, the left side panel 50, the front panel 54 and the rear panel 60. Except for the lower panel 22, all the seamless panels of the preferred embodiment are configured and contoured to correspond to the shape of a typical automobile 20.

The right side panel 46 and the left side panel 50 each further have an opening to which can be attached a hinged door that represents the door of the automobile and that allows access into the interior of the automobile. The opening allows access to the switches S1 and S2 and for maintenance of the LEDs or wiring when required. The interior of the automobile includes an LED mounting structure 70, as also shown in FIG. 2, into which is inserted the LED DS3 that is attached thereto by an adhesive or by press-fit.

While the invention has been described in detail and pictorially shown in the accompanying drawings it is not to be limited to such details, since many changes and modifications may be made to the invention without departing from the spirit and the scope thereof. For example, an audio integrated circuit can be added that produces a sound that resembles a horn or an engine when the LEDs illuminate. Additionally, a power switch can be added between the output of the a-c to d-c converter 80 and the input to the computer 84 and the computer/hard drive interface card 88. Hence, it is described to cover any and all modifications and forms that may come within the language and scope of the claims.

The invention claimed is:

1. An external hard drive enclosure (EHDE 10) that operates in combination with an a-c to d-c converter (80) having a power input (11) and a power output (13), wherein the power input (11) is supplied from a utility a-c power source (82); a computer (84) having a power input (15) and a USB output (17), wherein the power input (15) is connected to the power output (13) on the a-c to d-c converter (80) via a T-connector (72); an external hard drive (86) having a hard drive input/output (21); and a computer/hard drive interface card (88) having a USB input (23) connected to the USB output (17) on the computer (84) via a USB cable (76), a hard drive input/output (25) connected to the hard drive input/output (21) on the external hard drive (86), a first power output (01) connected to the power output (13) on the a-c to d-c converter via a power cable (74) and the T-connector (72), and second power output (02) that is controlled by the operation of the external hard drive (86), said EHDE (10) comprising:
   a) an electrical circuit (12) comprising:
      (1) a forward light circuit comprising a pair of LEDs (DS1, DS2) that are connected in parallel across the output (01),
      (2) a rearward light circuit comprising a pair of LEDs (DS4, DS5) that are connected in parallel across the output (02),
   b) a decorative enclosure (20) having:
      (1) a lower panel having a means for receiving and attaching the external hard drive and the computer/hard dive interface card,
      (2) a right side panel and a left side panel that extend upward from the lower panel,
      (3) a front panel and a rear panel that extend upward from the lower panel, wherein the front panel has a right and a left bore into which are inserted and attached the LEDs (DS1) and (DS2), and wherein the rear panel also has a right and a left bore into which are inserted and attached the LEDs (DS4) and (DS5), and
      (4) an upper panel that integrally interfaces with the upper edges of the right and left side panels, the front panel and the rear panel.

2. The external hard drive enclosure as specified in claim 1 wherein the output voltage from the a-c to d-c converter ranges between 5.0 volts d-c to 12.0 volts d-c.

3. The external hard drive enclosure as specified in claim 1 wherein said electrical circuit further comprises an interior light circuit comprising at least one LED (DS3) that is connected in parallel across the first LED (DS1) and the second LED (DS2), wherein the LED (DS3) is attached by an adhesive or by a press-fit to a mounting structure located on the interior of said decorative structure.

4. The external bard drive enclosure as specified in claim 3 wherein said electrical circuit further comprises a first switch (S1) connected in series between one of the leads from the output (O1) and the first LED (DS1).

5. The external hard drive enclosure as specified in claim 4 wherein said electrical circuit further comprises a second switch (S2) connected in series between one of the leads from the second LED (DS2) and the third LED (DS3), wherein when said first switch (S1) and the second switch (S2) are closed, both said forward circuit (14) and said interior light circuit (16) are on, and wherein when said switch (S2) is open or closed and the switch (S1) is open, both said forward circuit (14) and said interior light circuit (16) are off, and when said switch (S1) is closed and the switch (S2) is open, said forward circuit (14) is on and said interior light circuit (16) is off.

6. The external hard drive enclosure as specified in claim 1 wherein the LEDS (DS1-DS5) can be selected to illuminate in the same color or to illuminate in contrasting colors.

7. The external hard drive enclosure as specified in claim 1 wherein said decorative enclosure further comprises a lower panel having a cavity that is dimensioned to accept the external hard drive and the computer/hard drive interface card that are attached thereto by means of a set of complimentary hook and loop fasteners.

8. The external hard drive enclosure as specified in claim 1 wherein said decorative structure is selected from the group consisting of a vehicle, a ship, an animal, a toy, a plant, a musical instrument, a sport helmet or a geometric structure.

9. An external hard drive enclosure (EHDE 10) that operates in combination with an a-c to d-c converter (80) having a power input (11) and a power output (13), wherein the power input (11) is supplied from a utility a-c power source (82); a computer (84) having a power input (15) and a USB output (17), wherein the power input (15) is connected to the power output (13) on the a-c to d-c converter (80) via a T-connector (72); an external hard drive (86) having a hard drive input/output (21); and a computer/hard drive interface card (88) having a USB input (23) connected to the USB output (17) on the computer (84) via a USB cable (76), a hard drive input/output (25) connected to the hard drive input/output (21) on the external hard drive (86), a first power output (O1) connected to the power output (13) on the a-c to d-c converter via a power cable (74) and the T-connector (72), and a second power output (O2) that is controlled by the operation of the external hard drive (86), said EHDE (10) comprising:
   a) an electrical circuit (12) comprising:
      (1) a head light circuit (14) comprising:
         (a) a first LED (DS1) connected in parallel across the output (O1) on the computer/hard drive interface card (88), and
         (b) a second LED (DS2) connected in parallel across said first LED (DS1),
      (2) an interior light circuit (16) comprising at least one LED (DS3) connected in parallel across said first LED (DS1) and said second LED (DS2),
      (3) a tail light circuit (18) comprising:
         (a) a fourth LED (DS4) connected in parallel across the output (O2) on the computer/hard drive interface card (88), and
         (b) a fifth LED (DS5) connected in parallel across said fourth LED DS4),
   b) a decorative automobile enclosure (20) comprising:
      (1) a lower panel (22) having a right edge (24), a left edge (26), a front edge (28), a rear edge (30) and a cavity (32) that is dimensioned to receive and attach by an attachment means (31) the external hard drive (86) and the computer/hard drive interface card (88), wherein said cavity (32) has a front section (34) having a front access bore (36) and a rear section (38) having a rear access bore (40),
      (2) an integral right side panel (46) that extends upward from the right edge (24) of the lower panel (22),
      (3) an integral left side panel (50) that extends upward from the left edge (26) of the lower panel (22),
      (4) an integral front panel (54) that extends upward from the front edge (28) of the lower panel (22), wherein said front panel (54) having a right bore (56) and a left bore (58),
      (5) an integral rear panel (60) that extends upward from the rear edge (30) of the lower panel (22), wherein said rear panel (60) having a right bore (62) and a left bore (64), and
      (6) an upper panel (66) having a perimeter edge (68) that integrally interfaces with upper edges of the right side panel (46), the left side panel (50), the front panel (54) and the rear panel (60), wherein all the panels, with the exception of the lower panel, are seamless.

10. The external hard drive enclosure as specified in claim 9 wherein the output voltage from the a-c to d-c converter ranges between 5.0 volts d-c to 12.0 volts d-c.

11. The external hard drive enclosure as specified in claim 9 wherein the LEDs (DS1 and DS2) are comprised of white LEDs, the at least one LED (DS3) is comprised of a blue LED, and the LEDs (DS4 and DS5) are comprised of red LEDs.

12. The external hard drive enclosure as specified in claim 11 wherein the front and rear access bores on said cavity are dimensioned and located to accommodate the cables and wiring of said electrical circuit.

13. The external hard drive enclosure as specified in claim 11 wherein the front panel having a right side bore that is dimensioned to accept and retain by an attachment means the LED (DS1), and a left side bore that is dimensioned to accept and retain by an attachment means the LED (DS2), wherein the two LEDs (DS1 and DS2) represent the front lights of the automobile.

14. The external hard drive enclosure as specified in claim 11 wherein the interior of said automobile includes an LED mounting structure into which is inserted the LED (DS3) and attached thereto by an adhesive or by a press-fit.

15. The external hard drive enclosure as specified in claim 9 wherein said electrical circuit further comprises a first switch (S1) connected in series between one of the leads from the output (O1) and said first LED (DS1).

16. The external hard drive enclosure as specified in claim 15 wherein said electrical circuit further comprises a second switch (S2) connected in series between one of the leads from the second LED (DS2) and the third LED (DS3), wherein when said first switch (S1) and the second switch (S2) are closed, both said headlight circuit (14) and said interior light circuit (16) are on, and wherein when said switch (S2) is open, or closed and the switch (S1) is open, both said head light circuit (14) and said interior light circuit (16) are off, and when said switch (S1) is closed and the switch (S2) is open, said head light circuit (14) is on and said interior light circuit (16) is off.

17. The external hard drive enclosure as specified in claim 16 wherein the rear panel having a right bore that is dimensioned to accept and retain by an adhesive or by a press-fit the LED (DS4), and a left side bore that is dimensioned to accept and retain by an adhesive or by a press-fit the LED (DS5), wherein the two LEDs (DS4 and DS5) represent the rear tail lights of the automobile.

18. The external hard drive enclosure as specified in claim 9 wherein said means for attaching the external hard drive with the attached computer/hard drive interface card to a surface of the cavity comprises a set of complimentary hook and loop fasteners.

19. The external hard drive enclosure as specified in claim 18 wherein said cavity further comprises a living hinge cover that includes a securing means.

20. The external hard drive enclosure as specified in claim 9 wherein the right side panel and the left side panel each further comprise an opening to each of which is attached a hinged door that allows access to said switches (S1, S2) and to said LEDs.

* * * * *